Feb. 2, 1954   H. W. PETERS   2,667,827
BEVERAGE BREWING APPARATUS
Filed Feb. 16, 1950

INVENTOR.
Herbert W. Peters
BY
Blenning & Blenning
Attys.

Patented Feb. 2, 1954

2,667,827

UNITED STATES PATENT OFFICE 2,667,827

BEVERAGE BREWING APPARATUS

Herbert W. Peters, Milwaukee, Wis., assignor to Cory Corporation, Chicago, Ill., a corporation of Delaware Application February 16, 1950, Serial No. 144,433

10 Claims. (Cl. 99—282)

This invention which relates generally to the brewing of beverages, such as coffee, is concerned more especially with a system which is particularly well suited to the preparation of coffee or the like in relatively large batches.

Where coffee brew is required in quantities of several hundred gallons at a time, it has been commonly the practice to employ a large water-holding vessel having a top opening through which large pervious bags of comminuted coffee bean are introduced; and the weight of the filled bags is such that it is necessary to provide load-handling equipment to raise them to the required elevation and then lower them into the vessel. Such equipment is not only awkward and unsightly but is inefficient in that it is not capable of rapidly effecting thorough extraction of the coffee essential. Moreover, coffee brew produced by the steeping or boiling method nearly always contains an objectionable amount of pulverulent coffee solid in suspension.

A primary object of the present invention is to provide a system and process of brewing coffee or similar beverage in relatively large quantities to the end of achieving improved operational efficiency while at the same time improving the quality of the brew.

Another important object is to provide improved brewing equipment which is easier to operate than that heretofore employed, and which at the same time is intrinsically better adapted to consistent production of uniformly high quality beverage.

Figure 1:
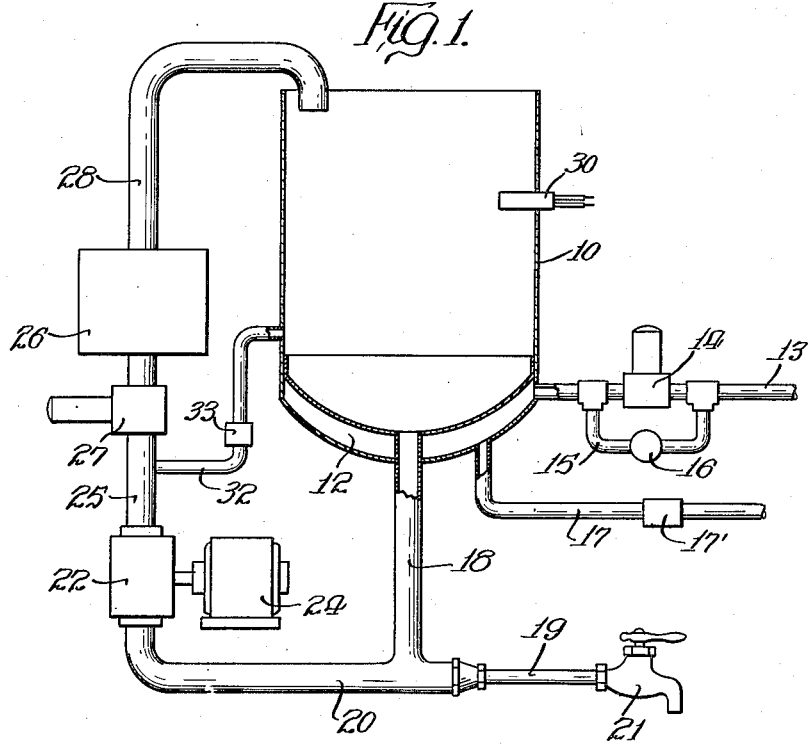
Figure 2:
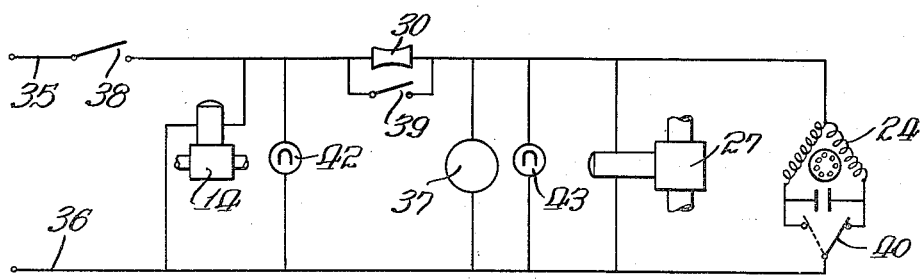

In the accompanying drawing wherein like reference numerals identify corresponding parts, Figure 1 is a schematic illustration showing the major components of a coffee brewing installation, typical of the present invention, certain timing equipment and circuit connections, adequately shown in Fig. 2, being omitted from the view; and Fig. 2 is a diagram of the control circuit applicable to the system of Fig. 1.

In Fig. 1, reference numeral 10 identifies a vessel or urn which may be large enough to hold several hundred gallons of water or coffee brew. The vessel is provided at the bottom with a steam jacket 12 and is shown open at the top. If desired, a removable cover may be provided. Water is supplied to the vessel either through a pipe connection (not shown) or by means of a hole; and a water gauge (also not shown) may be provided to facilitate observation of the water level. Suitable indicia associated with the water gauge enable the operator to accurately regulate the gallonage.

A pipe 13 connects the steam jacket 12 with a source of hot steam and includes a normally closed solenoid-operated valve 14. A by-pass 15 including a normally closed hand-operated valve 16 serves to admit steam to the steam jacket independently of the valve 14 for the purpose of regulating the temperature of the coffee brew after the brewing operation is completed and the valve 14 has automatically closed. If desired, the valve 16 can be thermostatically controlled in a known manner so as to maintain the coffee brew within a prescribed temperature range. A pipe 17 including a temperature-controlled valve 17' serves to discharge air and condensation from the steam jacket.

A pipe 18 extends downwardly from the bottom of the vessel 10 and is joined at its lower end to branch pipes 19 and 20 the former of which connects with a pet cock 21 while the latter connects with the intake of a pump 22 which is driven by an electric motor 24. The discharge port of the pump 22 is connected through a vertical pipe 25 to the bottom of a unit 26 through a normally closed solenoid-operated valve 27; and a pipe 28 connects the top of the unit 26 with the top of the vessel 10, substantially as shown.

The unit 26 is a refillable cartridge designed to hold a suitable quantity of comminuted coffee bean together with a suitable strainer or filter of a fineness sufficient to retain the pulverulent coffee solids while permitting adequately free flow of liquid into the pipe 28 and thence back into the vessel 10. For the reason that refillable cartridges for like use in related coffee brewing systems are well known, and because the design and construction of the cartridge, per se, does not form a part of this invention, I have omitted to show details thereof and, instead, have simply indicated the cartridge by means of the rectangle 26.

A thermally operated switch 30 which projects into the vessel 10 has a normally open electrical contact which closes when the water in the vessel reaches a predetermined temperature.

The pump 22, which may appropriately be of the gear type, is capable of driving liquid in either direction, depending upon the direction of rotation of its drive shaft; and the motor 24 is reversible accordingly. A by-pass conduit 32 which connects the pipe 25 with the interior of the vessel includes a constricted orifice 33 which may conveniently be an adjustable needle valve.

Coffee is brewed by first heating the water in the vessel 10 to a suitable brewing temperature and then circulating the hot water by means of the pump 22 through the cartridge 26 and thence via the pipe 28 back into the vessel. When the circulation of hot water has continued for a predetermined period of sufficient duration to effect complete extraction of the soluble essential oils, the pump 22 is reversed thereby withdrawing from the cartridge and connecting pipes the residuum of coffee brew remaining therein and returning the same to the vessel 10 by way of the pipes 20 and 18. Thereafter, and before the pump is stopped, the valve 27 is closed so as to prevent the coffee brew from rising thereabove under hydrostatic pressure.

The orifice 33 serves two purposes. First, it limits the output pressure developed by the pump in the event the flow through the cartridge 26 becomes obstructed, thus avoiding possible rupture of the cartridge, and, secondly, it serves to agitate the coffee brew and water in the vessel 10, thereby accomplishing a thorough intermixture of the two. This it does by injecting a stream of liquid into the vessel at a point near the bottom. Ordinarily, only a fraction of the total quantity of hot water is circulated through the cartridge 26, because that is all that is needed to achieve complete extraction of the coffee essentials. Such being the case, it will be apparent that the coffee brew returned to the vessel might not thoroughly intermingle at once with the water in the vessel which has not passed through the cartridge; and, unless some provision is made to insure a homogeneous mixture, a part of the brew drawn off may be too weak while the remainder is excessively strong.

It will be evident that a beverage brewing system basically like that of Fig. 1 could be made to function without automatic controls. For example, the water in the vessel 10 could be brought up to temperature by manually opening the steam valve 16; and then when the water reached a certain temperature, as indicated by a thermometer, the valve 27 could be opened manually while at the same time starting the motor 24 to cause the pump 22 to force hot water from the bottom of the vessel through the cartridge 26 and back to the vessel via the pipe 28. Then, after a certain elapsed time, the pump could be reversed long enough to drain the cartridge and pipes 25 and 28, after which the valve 27 would be closed just before stopping the pump. Such an arrangement and method of operation is practicable and within the scope of my invention, but it is not ideal because it involves more than a minimum of attention and know-how on the part of the operator.

In Fig. 2 there is shown diagrammatically the circuit connections and automatic controls which I prefer to utilize in conjunction with the beverage brewing system of Fig. 1. The various components, including an automatic timer, are combined, as shown, in a circuit comprising conductors 35 and 36 the terminals of which are connected to a current source, usually 110 volts A. C. The automatic timer is of the well-known type, obtainable as a standard commercial item, which upon being started goes through a cycle in a fixed time, during which it performs a predetermined series of electrical switching operations. In this case the timer includes a motor 37 and contacts constituting the equivalents of three switches 38, 39 and 40, each of which is shown in the condition which obtains when the timer is not in operation. Setting of the timer at starting position (or equivalent manual action) closes the switch 38, thus completing an energizing circuit through the solenoid winding of the valve 14, and at the same time through a pilot lamp 42 the purpose of which is to inform the operator that the steam has been turned on. The resultant opening of the valve 14 admits steam to the jacket 12. When the water in the vessel has consequently been brought to the prescribed temperature, the normally open contacts of the thermally operated switch 30 are closed, thereby completing energizing circuits to the motors 24 and 37, the solenoid of the valve 27, and the pilot lamp 43. The timer motor 37 being energized, the timer is started through a cycle of operation; and simultaneously the valve 27 opens and the motor 24 drives the pump 22 in the direction to force hot water upwardly through the cartridge 26. Immediately following the start of the timing cycle, the switch 39 closes thereby providing a shunt to the contacts of the thermally operated switch 30 and insuring against interruptions resulting from any fortuitous momentary opening of the latter contacts.

After a fixed period, which has been predetermined as sufficient to complete the brewing operation, the switch 40 moves to the alternate position indicated in dotted lines and, as a result, the motor 24 is reversed thereby reversing the flow as previously explained. After enough time has elapsed for the pump to complete its reverse operation, the switch 38 is opened and at the same time the switch 40 is moved to its normal full line position. Opening of the switch 38 completes the cycle and, of course, results in deenergization of the motors 24 and 37 and the windings of the two solenoid valves 14 and 27. The beverage is then ready to be drawn off through the pet cock 21. Should the temperature of the brew subsequently drop below a certain level, the valve 16 may be opened manually or, if it is provided with a thermostatic control, will open automatically and thus admit additional steam to the steam jacket.

The cartridge 26 is designed to be quickly replaceable as a unit and should be positioned at an elevation which will enable it to be conveniently handled by the operator. It is apparent that the beverage brewing system and process herein described are admirably adapted to accomplishment of the stated objects, particularly in those cases where the number of people to be served at a given time is very large.

While I have illustrated and described only what is regarded as a preferred embodiment of the invention, it should be manifest that there are numerous possible modifications within the scope and purview thereof as defined by the claims following.

I claim:

1. A beverage brewing system comprising a vessel adapted to hold a quantity of water, said vessel having a steam jacket, a steam supply pipe connected to said jacket and including a first normally closed electrically operated valve, a cartridge located exteriorly of the vessel and adapted to contain a quantity of comminuted beverage-making material such as ground coffee bean, said cartridge having an inlet and an outlet, a first conduit interconnecting said vessel with the cartridge inlet, a second conduit interconnecting the vessel with the cartridge outlet, a pump included in said first conduit, a second normally closed valve included in said first conduit and provided with an electromagnet winding for electrical operation, a motor for driving the pump, a normally open thermally operated switch responsive to the temperature of the water in the vessel and adapted to close when the water temperature has risen to a predetermined value, an automatic timer including a normally open starting contact, an energizing circuit for said first valve including said starting contact, a driving motor for the timer, and a second energizing circuit wherein said starting contact and said thermally operated switch are in series with each other and in series with the timer motor, pump motor and electromagnet winding of the second valve, said timer being operative to open its said starting contact upon expiration of a fixed period following closure of the thermally operated switch.

2. A beverage brewing system according to claim 1 wherein the pump and pump motor are reversible, and including contacts operated by the automatic timer which serve to cause the pump motor to run initially in one direction upon closure of the thermally operated switch and to reverse said pump motor upon completion of a fixed period, the respective directions being such that hot water is caused first to flow from the bottom of the vessel and through the cartridge to the top of the vessel, and thereafter in the opposite direction.

3. A beverage brewing system according to claim 1 wherein the timer motor is connected in parallel with the pump motor and the electromagnet winding of the second valve and in series with the thermally operated switch and the starting contact.

4. A beverage brewing system according to claim 1 wherein the automatic timer includes a normally open contact in shunt to the thermally operated switch, which contact closes immediately following closure of the second energizing circuit.

5. A beverage brewing system according to claim 1 including a by-pass conduit having a constricted orifice, said by-pass conduit being connected at one end to the first conduit between the pump and the cartridge and connected at its other end to the interior of the vessel.

6. A beverage brewing system according to claim 1 including a normally closed valve in shunt to the first valve and effective, when open, to admit steam to the steam jacket.

7. A beverage brewing system comprising a vessel adapted to hold a quantity of water, said vessel having a steam jacket, a steam supply pipe connected to said jacket and including a normally closed, electrically operated valve, a cartridge located exteriorly of the vessel and adapted to contain a quantity of comminuted beverage making material such as ground coffee bean, said cartridge having an inlet and an outlet, conduit means interconnecting the inlet and the outlet of said cartridge with said vessel, an electric motor driven pump interposed in said conduit means and operative to circulate water from said vessel through said cartridge, and an electrical control circuit having said valve and said pump connected in parallel therein, a first switch in series with both said valve and said pump operable upon being closed to complete the circuit for said valve, and a normally open, thermally operated switch responsive to the temperature of the water in the vessel and adapted to close when the water temperature has risen to a predetermined value, said switch being in series with said pump only to initiate operation of said pump only after the water in said vessel has reached a desired temperature.

8. In combination, a vessel for containing liquid, a discharge conduit for the vessel including a pump, a reversible motor for driving the pump, a normally open, thermally operated switch responsive to the temperature of the liquid in the vessel and operative to close when said temperature reaches a predetermined value, an energizing circuit for said motor including the thermally operated switch in series with said motor, a second switch in said energizing circuit, and an automatic timer having a motor for driving the same and an energizing circuit for said timer motor which includes said thermally operated switch, said timer being operatively associated with said second switch to open the energizing circuit for said motor upon completion of a prescribed interval following closure of the thermally operated switch, and a reversing switch for said pump motor, said reversing switch being actuated by said automatic timer to reverse the direction of said pump motor upon completion of a prescribed interval of less duration than the first mentioned interval following closure of said thermally operated switch.

9. A beverage system comprising a vessel adapted to hold a quantity of water, electrically controlled means for heating the water in the vessel, a cartridge located exteriorly of the vessel and adapted to contain a quantity of comminuted beverage making material such as ground coffee bean, a first conduit connecting the inlet end of said cartridge with the vessel, a second conduit connecting the outlet end of said cartridge with the same vessel, an electric motor driven pump in said first conduit operable when operating to draw fluid only from the vessel and circulate the same through the system, an electrically controlled valve in said first conduit intermediate said pump and said cartridge, an electrical control circuit including said electrically controlled means for heating the water, said electrically controlled valve and the electric motor of said pump and additionally including a thermostat responsive to the temperature of the water in the vessel and a manually operable switch, said thermostatic switch and said manual switch exercising joint control over the motor of said pump, and a third conduit connected at one end to the vessel near the bottom thereof and connected at the remaining end to said first conduit intermediate said pump and said valve for enabling discharge of fluid to the vessel through said third conduit whenever said pump is operating and independently of the position of said valve.

10. A beverage system comprising a vessel adapted to hold a quantity of water, means for heating the water in the vessel, a cartridge located exteriorly of the vessel and adapted to contain a quantity of comminuted beverage making material such as ground coffee bean, a first conduit connecting the inlet end of the cartridge with said vessel, a second conduit connecting the outlet end of the cartridge with said vessel, a pump in said first conduit operable when operating to draw fluid only from said vessel and circulate the same through the system, a valve in said first conduit intermediate said pump and said cartridge, and a third conduit connected at one end to said vessel near the bottom thereof and connected at the remaining end to said first conduit intermediate said pump and said valve for enabling discharge of fluid to the vessel through said third conduit whenever said pump is operating and independently of the position of said valve.

HERBERT W. PETERS.

References Cited in the file of this patent

UNITED STATES PATENTS

| Number | Name | Date |
|---|---|---|
| Re. 22,022 | Peters | Feb. 10, 1942 |
| 755,041 | Peterman | Mar. 22, 1904 |
| 1,079,474 | Davis | Nov. 25, 1913 |
| 1,226,005 | Rathman | May 15, 1917 |
| 1,249,818 | Pedersen | Dec. 11, 1917 |
| 1,385,593 | Strohback | July 26, 1921 |
| 1,607,899 | Long | Nov. 23, 1926 |
| 1,612,410 | Bellois et al. | Dec. 28, 1926 |
| 1,621,620 | Bast | Mar. 22, 1927 |
| 1,710,218 | Kelly | Apr. 23, 1929 |
| 1,774,980 | Lambert | Sept. 2, 1930 |
| 1,805,159 | Bauer et al. | May 12, 1931 |
| 1,887,849 | Pierce | Nov. 15, 1932 |
| 1,929,231 | Yirava | Oct. 3, 1933 |
| 2,014,325 | Grilli | Sept. 10, 1935 |
| 2,050,303 | Forshee | Aug. 11, 1936 |
| 2,447,692 | Evensen | Aug. 24, 1948 |
| 2,493,932 | Swanson | Jan. 10, 1950 |
| 2,507,255 | Kaufman | May 9, 1950 |
| 2,544,836 | Hotvedt | Mar. 13, 1951 |